(12) United States Patent
Arai

(10) Patent No.: US 11,157,297 B2
(45) Date of Patent: Oct. 26, 2021

(54) CONTROL DEVICE AND CONTROL METHOD FOR PREVENTING UNINTENTIONAL OVERWRITING OF DATA

(71) Applicant: OMRON Corporation, Kyoto (JP)

(72) Inventor: Wataru Arai, Otsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/973,781

(22) PCT Filed: Jun. 18, 2019

(86) PCT No.: PCT/JP2019/024144
§ 371 (c)(1),
(2) Date: Dec. 10, 2020

(87) PCT Pub. No.: WO2020/008867
PCT Pub. Date: Jan. 9, 2020

(65) Prior Publication Data
US 2021/0255881 A1    Aug. 19, 2021

(30) Foreign Application Priority Data
Jul. 3, 2018    (JP) .............................. JP2018-126934

(51) Int. Cl.
*G06F 9/44*    (2018.01)
*G06F 9/455*    (2018.01)
(Continued)

(52) U.S. Cl.
CPC .......... *G06F 9/45504* (2013.01); *G06F 8/437* (2013.01); *G06F 8/447* (2013.01); *G06F 9/44505* (2013.01)

(58) Field of Classification Search
None
See application file for complete search history.

(56) References Cited

U.S. PATENT DOCUMENTS

| 2004/0154007 | A1* | 8/2004 | Koizumi | ............. | G06F 11/3624 |
| | | | | | 717/151 |
| 2013/0290942 | A1* | 10/2013 | Ishizaki | .................. | G06F 8/443 |
| | | | | | 717/151 |
| 2019/0384590 | A1* | 12/2019 | Yamada | .................. | G06F 11/00 |

FOREIGN PATENT DOCUMENTS

| JP | H04260134 | 9/1992 |
| JP | 2000132208 | 5/2000 |

(Continued)

OTHER PUBLICATIONS

"International Search Report (Form PCT/ISA/210)" of PCT/JP2019/024144, dated Aug. 13, 2019, with English translation thereof, pp. 1-4.

(Continued)

*Primary Examiner* — Insun Kang
(74) *Attorney, Agent, or Firm* — JCIPRNET

(57) ABSTRACT

The objective of the present invention is to prevent a conflict between variable names and consequently the unintentional overwriting of data when a plurality of programs that define a shared variable exist. A control device (1) is equipped with a program management part (11), a data storage part (13a), and a shared variable symbol table (13b). The program management part (11) acquires an identifier for a first user program, generates a shared variable name that includes the identifier and a variable name of a shared variable defined in the first user program, associates the shared variable name and an address of the shared variable with each other, and records these in the shared variable symbol table (13b).

11 Claims, 5 Drawing Sheets

(51) Int. Cl.
  *G06F 8/41* (2018.01)
  *G06F 9/445* (2018.01)

(56) References Cited

FOREIGN PATENT DOCUMENTS

| | | |
|---|---|---|
| JP | 2001109632 | 4/2001 |
| JP | 2001282864 | 10/2001 |
| JP | 2006099639 | 4/2006 |
| JP | 2006244488 | 9/2006 |
| WO | 2018198439 | 11/2018 |

OTHER PUBLICATIONS

"Written Opinion of the International Searching Authority (Form PCT/ISA/237)" of PCT/JP2019/024144, dated Aug. 13, 2019, with English translation thereof, pp. 1-8.

* cited by examiner

Shared variable symbol table

| Shared variable name | Address |
|---|---|
| Press. status | 0X00000000 |
| Cutter. status | 0X00000001 |
| ⋮ | ⋮ |

CONTROL DEVICE AND CONTROL METHOD FOR PREVENTING UNINTENTIONAL OVERWRITING OF DATA

CROSS-REFERENCE TO RELATED APPLICATION

This application is a 371 application of the International PCT application serial no. PCT/JP2019/024144, filed on Jun. 18, 2019, which claims the priority benefits of Japan Patent Application No. 2018-126934, filed on Jul. 3, 2018. The entirety of each of the above-mentioned patent applications is hereby incorporated by reference herein and made a part of this specification.

BACKGROUND

Technical Field

The disclosure relates to a control device for preventing unintentional overwriting of data shared between user programs and a control method using the control device.

Description of Related Art

Conventionally, the following control controlling device is known (see Patent Document 1 (Japanese Patent Application Laid-Open No. 2000-132208)). That is, when there are a plurality of user programs, data are exchanged between them via a data storage part. When data exchange is performed between the programs, a variable name is given to the data, and each user program writes or reads the data from the data storage part using the variable name as a key.

Also, conventionally, a platform for data services between application frameworks different from each other is known (see Patent Document 2 (Japanese Patent Application Laid-Open No. 2006-244488)).

In addition, conventionally, a name mark management method of a language management system for managing name marks in input/output specification description in a language processing system which processes specification description or language description or in an input source program/output object program is known (see Patent Document 3 (Japanese Patent Publication No. Hei 4-260134)).

SUMMARY

However, none of the above techniques is a technique for preventing a conflict between variable names and unintentional overwriting of data when there are a plurality of programs.

One aspect of the disclosure is to prevent a conflict between variable names and unintentional overwriting of data when there are a plurality of programs which define a shared variable.

Means for Solving the Problems

To solve the above problem, a control device according to one aspect of the disclosure includes a program management part, a data storage part, and a shared variable symbol table. The program management part executes a first user program and a second user program. The data storage part stores data of a shared variable referenceable from both the first user program and the second user program. The shared variable symbol table stores an address of the shared variable in the data storage part. The program management part acquires an identifier of the first user program, generates a shared variable name including the identifier and a variable name of the shared variable defined in the first user program, and associates the shared variable name and the address of the shared variable with each other and records them in the shared variable symbol table.

To solve the above problem, a control method according to one aspect of the disclosure, which is a method of executing a first user program and a second user program, includes the following steps. An identifier of the first user program is acquired. A shared variable name including the identifier and a variable name of a shared variable which is referenceable from the second user program and defined in the first user program is generated. The shared variable name and an address of the shared variable are associated with each other and recorded in a shared variable symbol table. Data of the shared variable are stored in an area corresponding to the address in the data storage part.

Effects

According to one aspect of the disclosure, it is possible to prevent a conflict between variable names and unintentional overwriting of data when there are a plurality of programs which define a shared variable.

DESCRIPTION OF THE EMBODIMENTS

§ 1 Application Example

Figure 1:
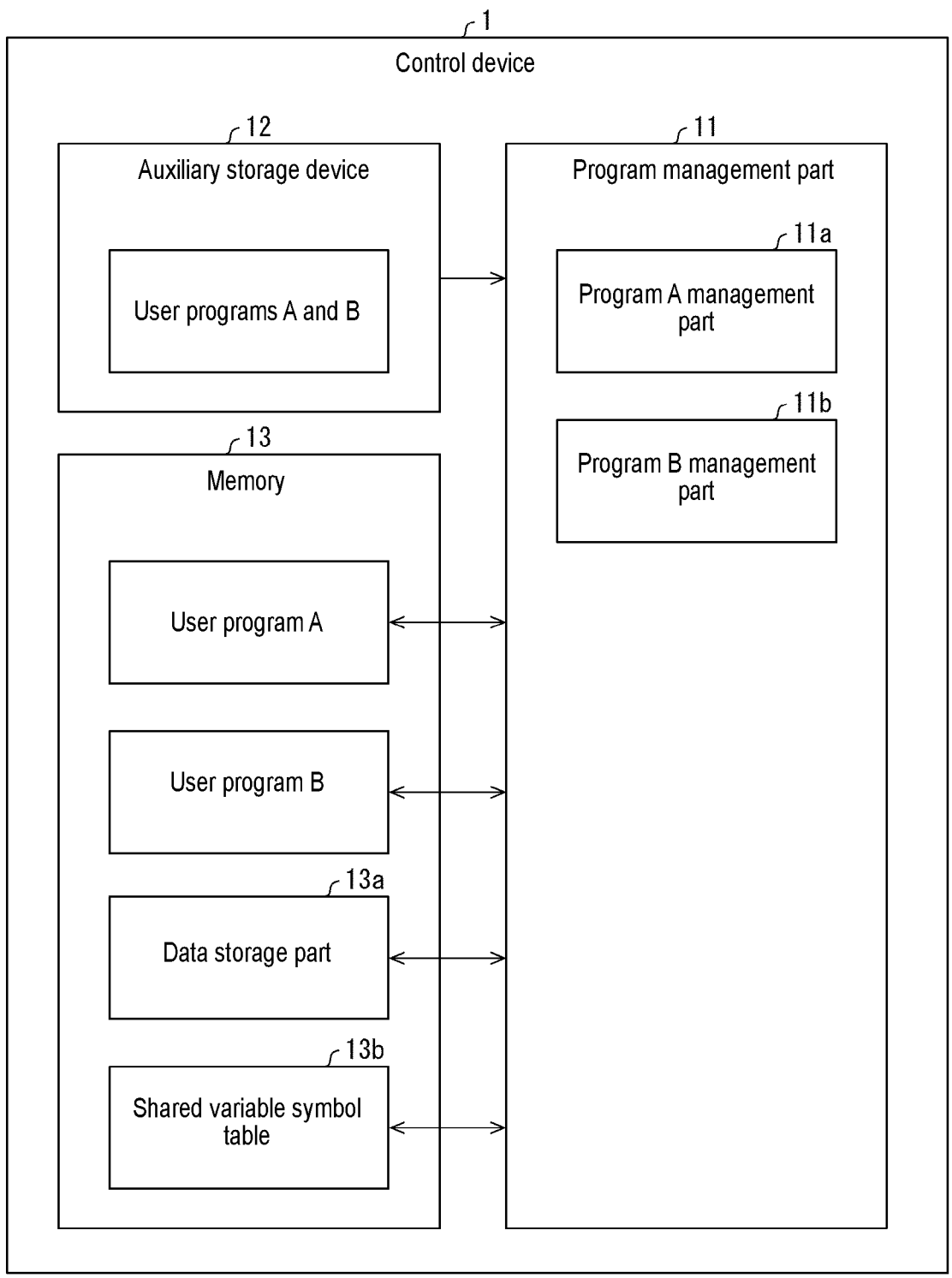
FIG. 1 is a block diagram schematically showing an example of the configuration of a control device according to the disclosure.

An example of an application scene of a control device according to this embodiment will be described with reference to FIG. 1. FIG. 1 is a block diagram schematically showing an example of the configuration of the control device according to this embodiment. A control device 1 according to this embodiment is a device for preventing a conflict between variable names and unintentional overwriting of data when there are a plurality of user programs which define a shared variable.

As shown in FIG. 1, the control device 1 includes a program management part 11, an auxiliary storage device 12, and a memory 13.

The program management part 11 includes a program A management part 11*a* and a program B management part 11*b*. In this embodiment, a first user program (hereinafter referred to as a program A) and a second user program (hereinafter referred to as a program B) are executed by the program management part 11.

The auxiliary storage device 12 stores the program A and the program B. The memory 13 temporarily stores the program A and the program B. The memory 13 includes a data storage part 13a and a shared variable symbol table 13b. The data storage part 13a stores data of shared variable which may be referenced from both the program A and the program B. The shared variable symbol table 13b stores the addresses of the shared variables in the data storage part 13a.

The program A management part 11a generates a shared variable name including a variable name of a shared variable and an identifier of the program A for the shared variable defined in the program A. The program A management part 11a associates the shared variable name and the address with each other and manages them in the shared variable symbol table. When the program B accesses (reads/writes) the shared variable, the shared variable name is used for access.

According to the control device according to this embodiment, it is possible to prevent a conflict between variable names and unintentional overwriting of data when there are a plurality of programs which define a shared variable.

§ 2 Configuration Example

Schematic Configuration of Control Device 1

An example of a schematic configuration of the control device 1 will be described with reference to FIG. 1 and FIG. 2. FIG. 1 is a block diagram schematically showing an example of the configuration of the control device according to this embodiment. As shown in FIG. 1, the control device 1 includes a program management part 11, an auxiliary storage device 12, and a memory 13. The control device 1 may be a device such as a PLC (programmable logic controller) which controls the operation of various devices.

As shown in FIG. 1, the program management part 11 includes a program A management part 11a and a program B management part 11b. In this embodiment, the program A and the program B are executed by the program management part 11. Specifically, while the configuration in which the program A is executed by the program A management part 11a and the program B is executed by the program B management part 11b will be illustrated, this embodiment is not limited thereto.

Further, the details of the program A and the program B will be described later.

The auxiliary storage device 12 is a device for storing the program A and the program B. Normally, the program A and the program B are stored in the auxiliary storage device 12. The auxiliary storage device 12 is, for example, a non-volatile memory, a hard disk, or the like, but is not limited thereto. By providing the auxiliary storage device 12, data loss can be reliably prevented.

The memory 13 temporarily stores the program A and the program B. The memory 13 is, for example, a volatile memory or the like, but is not limited thereto. The memory 13 includes a data storage part 13a and a shared variable symbol table 13b. The data storage part 13a stores data of shared variables which may be referenced from both the program A and the program B. The shared variable symbol table 13b stores the addresses of the shared variables in the data storage part 13a.

The "shared variable" as used herein refers to a variable which may be referenced from a plurality of user programs. The shared variable symbol table 13b stores the storage locations (address) of the shared variables stored in the data storage part 13a.

Configuration Example 1 of Program Management Part

Figures 2, 3:
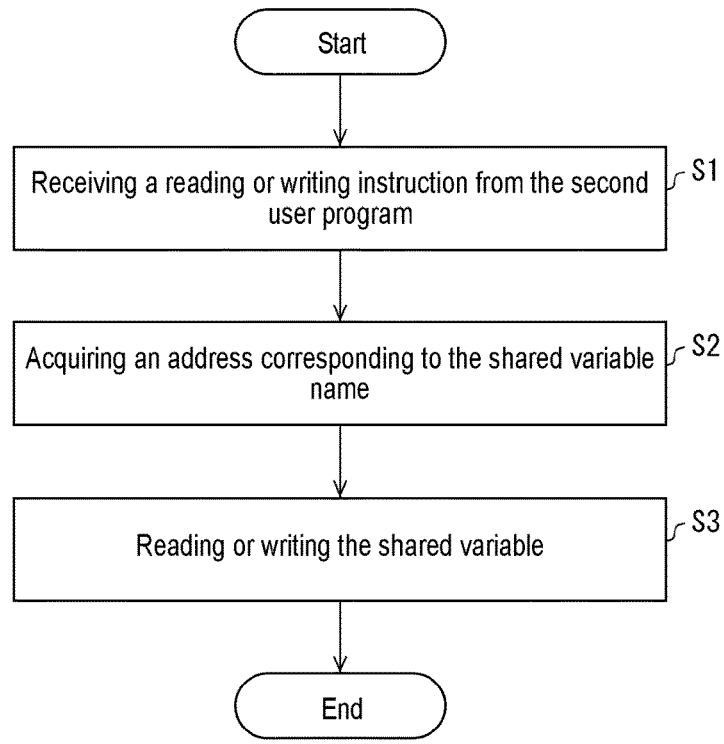
FIG. 2 is a view showing details of the shared variable symbol table of FIG. 1.
FIG. 3 is a flowchart of a process executed by the program management part in a configuration example 2 of the program management part.

FIG. 2 is a view showing details of the shared variable symbol table 13b of FIG. 1. As a configuration example 1 of the program management part, in this embodiment, upon receiving an instruction from the user to execute the program A, the program management part 11 loads the program A from the auxiliary storage device 12 and stores the program A in the memory 13. Herein, for example, it is assumed that the program A is a compiler type program. The program A stored in the auxiliary storage device 12 is a program compiled in machine language. The compiled program A includes a symbol table showing the correspondences between the shared variables and the addresses of the shared variables. A non-shared variable is a variable which is used only within the program A and can only be referenced by the program A. In the compiled program A, the address of the non-shared variable is specified. In the compiled program A, the information of the variable name of the non-shared variable does not have to remain. However, the program A includes the information of the variable name of the shared variable and the information of the address even after being compiled.

The program management part 11 acquires the information of the variable name of the shared variable, the information of the address, and an identifier of the program A. The program management part 11 generates a shared variable name including the variable name of the shared variable defined in the program A and the identifier. The program management part 11 associates the shared variable name and the address of the shared variable with each other and records them in the shared variable symbol table 13b. Further, the program management part 11 writes the data of the shared variable to the address of the data storage part 13a.

In other words, the shared variable name generated by the program management part 11 includes the variable name of the shared variable and the identifier. The program management part 11 associates the shared variable name and the address of the shared variable with each other and records them in the shared variable symbol table 13b.

The identifier of the user program is a character string or a numerical value unique to the user program. The identifiers of a plurality of user programs are set so that they do not repeat each other. For example, the program name of the user program, the path of the directory where the user program is configured, a character string arbitrarily set by the user, a UUID (universally unique identifier), or a domain name may be used as the identifier of the user program.

In the example of FIG. 2, the identifier of the program A is "Press". The variable name of the shared variable defined in the program A is "status". The variable name "status" is a variable name defined in the source code of the program A. The program management part 11 combines the identifier "Press" with the original variable name "status" to generate the shared variable name "Press.status" of the shared variable. The shared variable name "Press.status" is a variable name used as a key when the shared variable is referenced by another program B. Herein, "." is added between the identifier and the variable name, but any character or character string may be used instead. Also, there may be no character between the identifier and the variable name. The order of the identifier and the variable name is also arbitrary. For example, "Cutter.status" shown in FIG. 2 is a shared variable name of a shared variable defined in the program B. The identifier of the program B is "Cutter". The variable name of the shared variable defined in the program B is "status". The program management part 11 generates a shared variable name including an identifier and a variable name according to a predetermined rule. Therefore, even if a plurality of shared variables having the same variable name "status" are defined in a plurality of user programs, it is possible to avoid a conflict between the shared variable names. While the shared variable names are, as an example, Press.status and Cutter.status and the addresses corresponding to these shared variable names are, as an example, respectively 0X00000000 and 0X00000001, this embodiment is not limited thereto.

According to the above aspect, it is possible to prevent a conflict between variable names and unintentional overwriting of data when there are a plurality of user programs which define a shared variable.

Configuration Example 2 of Program Management Part

FIG. 3 is a flowchart of a process executed by a program management part in a configuration example 2 of the program management part. As shown in FIG. 3, upon receiving an instruction from the program B to read or write the shared variable using the shared variable name as a key, the program B management part 11b acquires an address corresponding to the shared variable name from the shared variable symbol table 13b. By using the address, the program B management part 11b reads or writes the shared variable of the data storage part 13a.

Specifically, in step S1, the program B management part 11b receives an instruction from the program B to read or write the shared variable using the shared variable name as a key. Subsequently, in step S2, the program B management part 11b acquires the address corresponding to the shared variable name from the shared variable symbol table 13b. Finally, in step S3, the program B management part 11b reads or writes the shared variable of the data storage part 13a by using the address.

According to the above aspect, the program B management part 11b can read or write the shared variable of the data storage part 13a already generated by the program A.

Configuration Example 1 of Program A

A configuration example 1 of the program A will be described in detail. The program A is, for example, compiled in machine language. The program A includes the information of the variable name of the shared variable and the information of the address even after being compiled in machine language. The program A management part 11a acquires the variable name of the shared variable and the address from the program A. The program A management part 11a which executes the program A may read or write the shared variable of the data storage part 13a by using the acquired address.

Herein, while the program A includes a program using a ladder language, a C language, or the like, this embodiment is not limited thereto. The ladder language is a programming language suitable for the case where the control device 1 controls the operation of a machine tool, a production device, or the like.

Specifically, the program A management part 11a acquires the symbol table and the identifier of the program A from the program A. The program A management part 11a attaches the identifier to the variable name of the shared variable to generate the shared variable name. Then, the program A management part 11a associates the shared variable name and the address with each other and records them in the shared variable symbol table 13b. Afterwards, the program A management part 11a executes the program A. Next, the program A management part 11a receives from the program A a data writing instruction using the address as a key. Finally, the program A management part 11a writes data to the memory 13 using the address as a key. Herein, the shared variable name is generated when the program A is loaded.

According to the above aspect, the program A management part 11a can acquire the variable name of the shared variable and the address from the program A.

For example, a case where a production device is controlled by the program A which is in the ladder language and the data processing is performed by the program B which is in the Java language will be described. The program A acquires data (sensing information, etc.) about the production line from the production device or a sensor. The program A has the data storage part 13a record the acquired data as a shared variable. The program B reads the shared variable recorded by the program A and performs statistical processing by using, for example, the sensing information. The ladder language is a programming language suitable for control, and a general-purpose programming language such as Java is a programming language suitable for information processing. Therefore, different programming languages can be used to perform appropriate processing on common data.

Also, the existing program management part and the program B may be replaced with the program management part 11 and the program B of this embodiment while the existing program A continues to be executed (i.e., while the production device keeps running). Therefore, the existing control device can be changed to the control device of this embodiment which can avoid a conflict between shared variable names.

Configuration Example 2 of Program A

Figure 4:
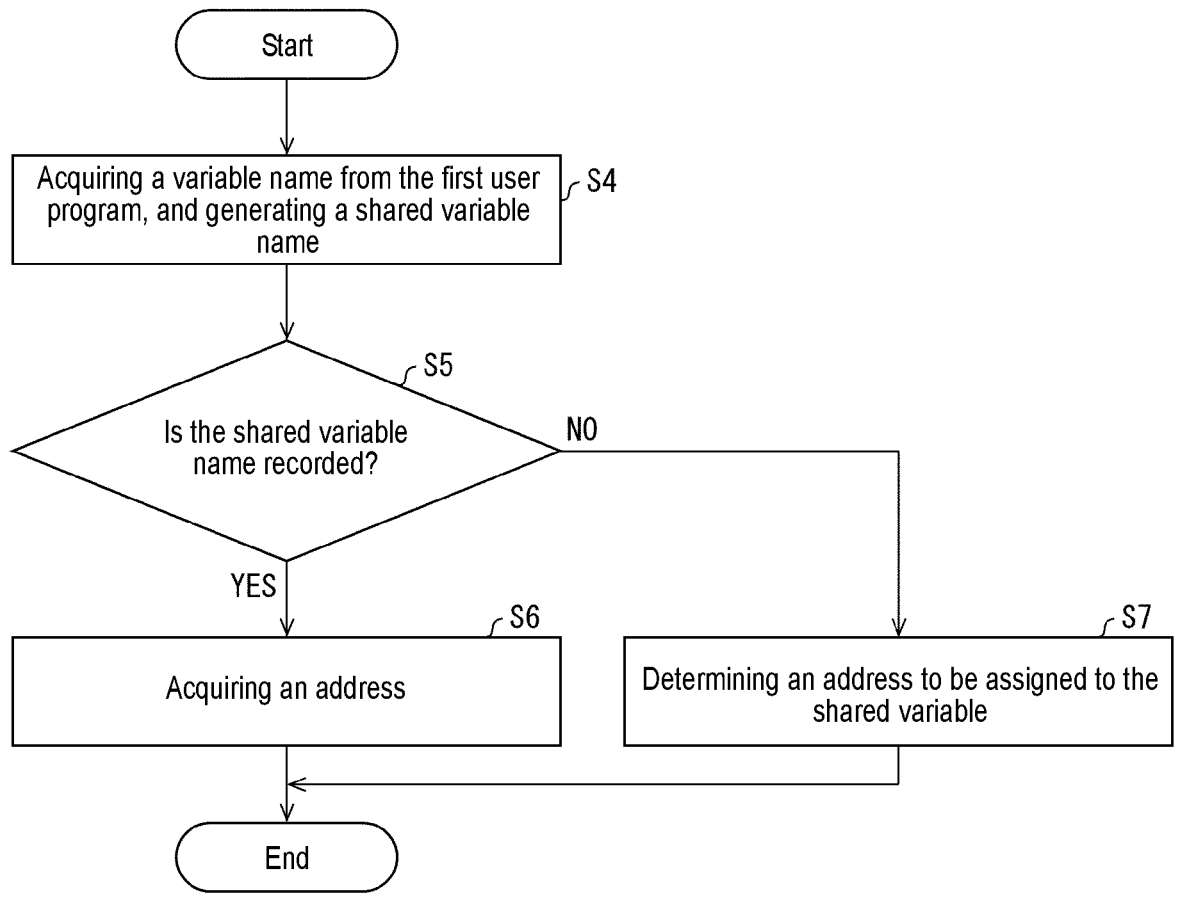
FIG. 4 is a flowchart of a process executed by the program management part in a configuration example 2 of the program A.

FIG. 4 is a flowchart of a process executed by the program A management part 11a in a configuration example 2 of the program A. The program A is, for example, an interpreter type program. The program A includes information of the variable name of the shared variable. The program A management part 11a functions as an interpreter for the program A.

In step S4 in FIG. 4, upon acquiring the variable name of the shared variable and an identifier from the program A, the program A management part 11a generates the shared variable name. Afterwards, in step S5, the program A management part 11a determines whether the shared variable name is recorded. When the shared variable name is already recorded in the shared variable symbol table 13b (YES in S5), the program A management part 11a acquires the address of the shared variable (step S6). On the other hand, when the shared variable name is not recorded in the shared variable symbol table 13b (NO in S5), the program A management part 11a determines the address to be assigned to the shared variable (step S7). The program A management part 11a associates the determined address and the shared variable name with each other and records them in the shared variable symbol table 13b.

Also, the interpreter type program may be, for example, a program using a programming language such as Java (registered trademark), JavaScript (registered trademark), Python, or the like. For example, if the user program is a Java program, the user program stored in the auxiliary storage device 12 is compiled into intermediate code, and the program A management part 11a functions as a Java virtual machine interpreting and executing the user program which is the intermediate code.

Specifically, the program A management part 11a acquires the identifier of the program A from the program A. Further, the program A management part 11a executes the program A. Then, the program A management part 11a receives a data writing instruction using the variable name as a key. Afterwards, the program A management part 11a attaches the identifier of the program A to the variable name of the shared variable to generate a shared variable name. Then, the program A management part 11a references the shared variable symbol table 13b and determines whether the shared variable is defined. If the shared variable is undefined, an address is determined, and the address is assigned to the shared variable. The program A management part 11a associates the determined address and the shared variable name with each other and records them in the shared variable symbol table 13b. On the other hand, if the shared variable is defined, the assigned address is acquired from the shared variable symbol table 13b. Finally, the program A management part 11a writes data to the data storage part 13a using the address as a key. Herein, the program A management part 11a determines whether it is a shared variable at the time of execution. Whether the variable used in the program A is a shared variable or a non-shared variable is defined in the program A. For example, in the program A, by specifying "shared" or "non-shared" for a variable, it is defined whether the variable is a shared variable or a non-shared variable. In addition, the program A management part 11a generates the shared variable name at the time of execution of the program A.

According to the above aspect, the program management part 11 can prevent duplication of shared variables and appropriately manage the shared variables.

For example, in the source code of the program A, the writing to the shared variable "status" may be described as status="OK" in a general method. This means the writing of the value "OK" to the shared variable "status". Herein, "=" is an operator which means assignment of a value. Alternatively, the program A management part 11a may provide an API (application program interface) function for writing to the shared variable. For example, in the source code of the program A, the writing to the shared variable "status" may be described as write ("status", "OK") using the API function "write". In either case, the program A passes the variable name "status" of the shared variable as a key to the program A management part 11a.

Acquisition Example 1 of Identifier

The program A described above includes the information of the identifier, and the program A management part 11a acquires the identifier from the program A.

Acquisition Example 2 of Identifier

For example, the program A management part 11a may acquire the identifier from a configuration file. A configuration file which defines the identifier of the program A may be stored in a predetermined directory.

Configuration Example 3 of Program Management Part

Figure 5:
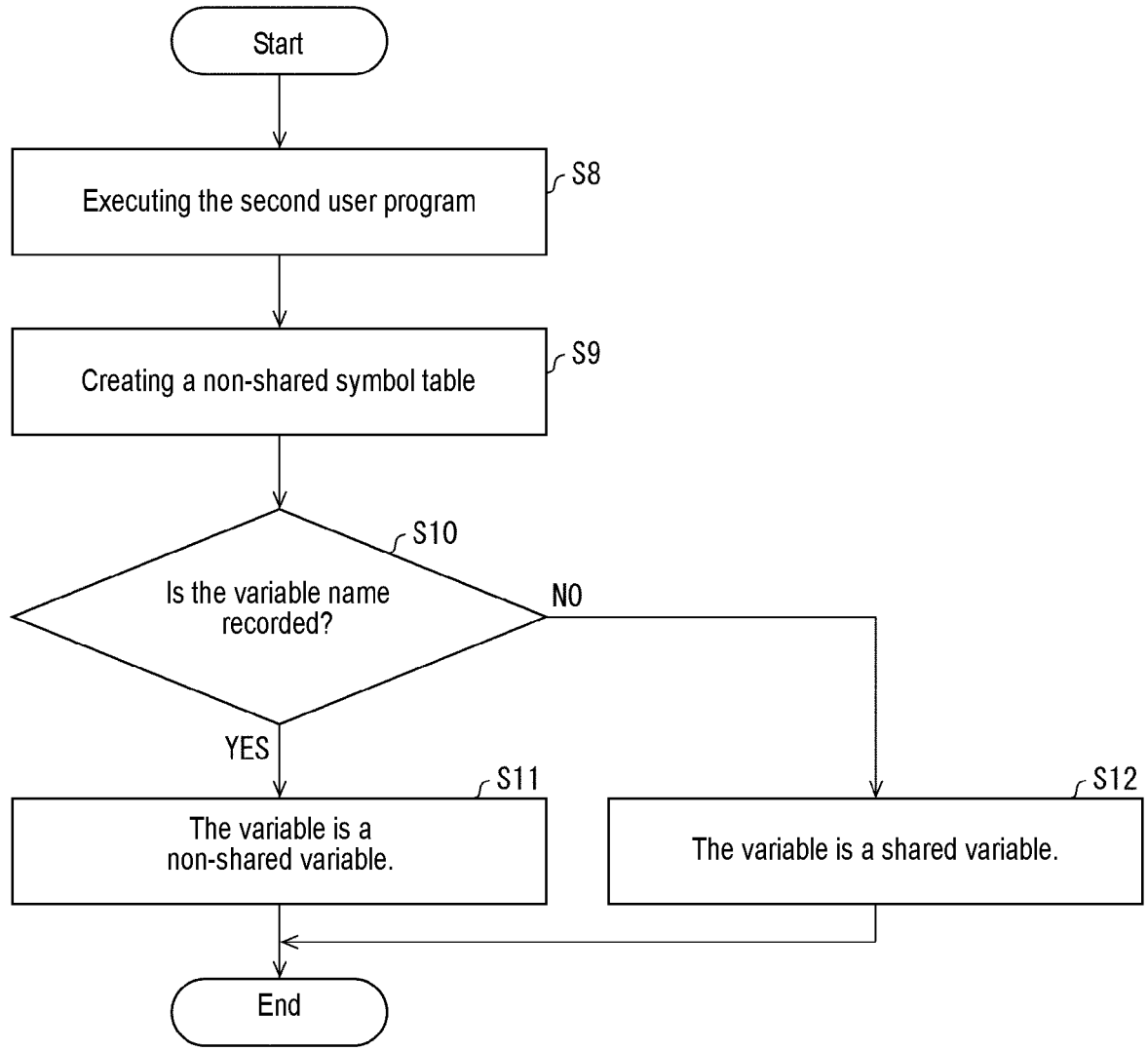
FIG. 5 is a flowchart of a process executed by the program management part in a configuration example 3 of the program management part.

FIG. 5 is a flowchart of a process executed by a program management part in a configuration example 3 of the program management part. Herein, the program B is an interpreter type program. The program A is executed earlier, and shared variable names and addresses of shared variables defined in the program A are recorded in the shared variable symbol table 13b. As shown in FIG. 5, in step S8, the program B management part 11b executes the program B. Afterwards, in step S9, the program B management part 11b creates a non-shared symbol table which records non-shared variables defined in the program B and addresses of the non-shared variables. The non-shared symbol table is created separately for each user program to be executed. For example, when a variable is defined as a non-shared variable in the program B, the variable name and the assigned address are recorded in the non-shared symbol table. The program B management part 11b stores the non-shared symbol table. Next, in step S10, the program B management part 11b determines whether a variable name is recorded. When the variable name of the variable to be referenced (read) in the program B is recorded in the non-shared symbol table (YES in S10), the program B management part 11b determines that the variable is a non-shared variable (step S11). On the other hand, when the variable name of the variable to be referenced (read) in the program B is not recorded in the non-shared symbol table (NO in S10), the program B management part 11b determines that the variable is a shared variable (step S12).

According to the above aspect, according to whether the variable name of the variable to be referenced in the program B is recorded in the non-shared symbol table, the program B management part 11b can suitably determine whether the variable is a non-shared variable or a shared variable. For example, even if the shared variable name "Press.status" of the shared variable defined in the program A and the variable name of a non-shared variable referenced in the program B happen to match, it is possible to prevent the non-shared variable of the program B from being mistakenly determined to be the shared variable.

Configuration Example 4 of Program Management Part

A configuration example 4 of the program management part 11 will be described in detail. Herein, the program B is a compiler type program. The program A is executed earlier, and shared variable names and addresses of shared variables defined in the program A are recorded in the shared variable symbol table 13b. The program B management part 11b which executes the program B provides an API function for reading the shared variable. For example, in the source code of the program B, the reference (reading) of the shared variable "Press.status" may be described as read ("Press.status") using the API function "read". The program B passes the shared variable name "Press.status" of the shared variable as a key to the program B management part 11b via the API function. The program B management part 11b acquires the corresponding address from the shared variable symbol table. The program B management part 11b acquires data of the shared variable from the data storage part 13a using the address as a key. The program B management part 11b returns the data of the shared variable to the program B.

Generally, the compiler type user program has been converted into machine language. Therefore, a variable name specified in the source file is converted into an address and does not remain. According to the above aspect, by using the API which references the shared variable, the shared variable name in the compiled program B remains as a key.

In the control device 1, the program A and the program B may be configured in programming languages different from each other. According to the above aspect, variables can be shared between the program A and the program B which are configured in programming languages different from each other.

For example, the program A and the program B may also be configured in the same programming language.

Configuration Example 1 of Identifier

The identifier may include the path of the program A. For example, when the user creates the program A, the path of the directory where the program A is to be configured is specified in the program A. Alternatively, the program A itself, which is executed by the program A management part 11a, may acquire the path of the program A.

Configuration Example 2 of Identifier

The identifier may include the file name of the program A. Like the path, the file name may be specified in the program A, or the program A itself, which is executed by the program A management part 11a, may acquire the file name of the program A.

The identifier may include the path and the file name of the program A. As mentioned above, the identifier may include a character string arbitrarily set by the user, a UUID (universally unique identifier), and/or a domain name. The domain name herein is a domain name (e.g., omron.co.jp or jp.co.omron) owned by the provider (provider company) of the user program.

Control Method

Figure 6:
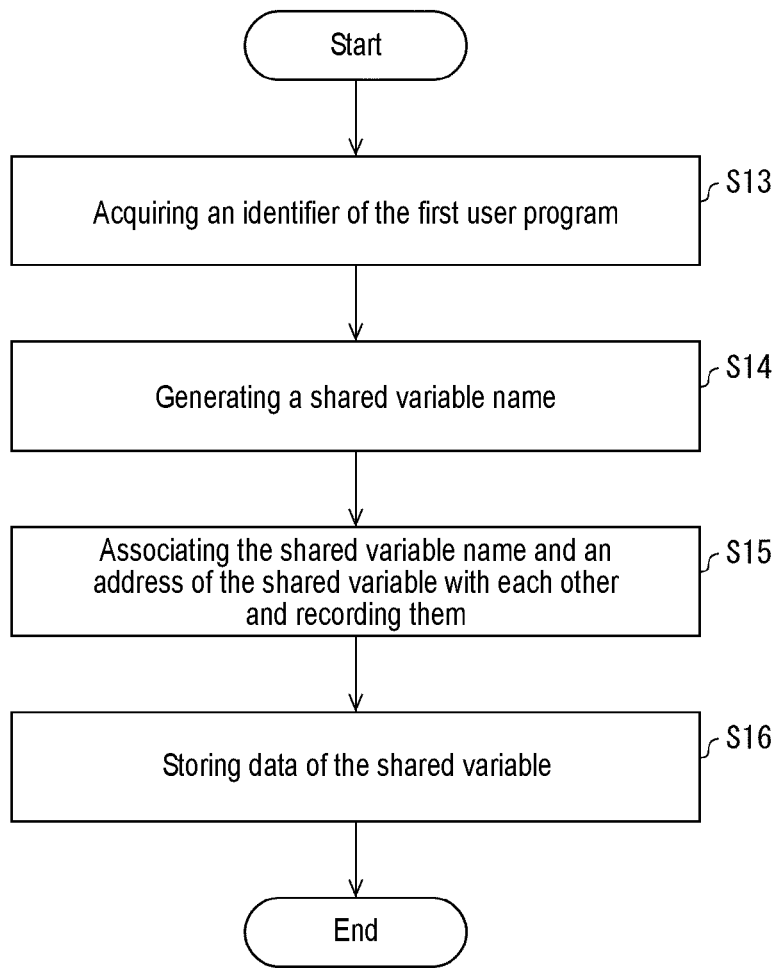
FIG. 6 is a flowchart showing each step in a control method according to an embodiment 1 of the disclosure.

FIG. 6 is a flowchart showing each step in a control method according to this embodiment. As shown in FIG. 6, in step S13, the program A management part 11a acquires an identifier of the program A. Afterwards, in step S14, the program A management part 11a generates a shared variable name including the identifier and a variable name of a shared variable which may be referenced from the program B and is defined in the program A. Next, in step S15, the program A management part 11a associates the shared variable name and an address of the shared variable with each other and records them in the shared variable symbol table 13b. Subsequently, in step S16, the program A management part 11a stores data of the shared variable to an area corresponding to the address in the data storage part 13a.

According to the above aspect, it is possible to prevent a conflict between variable names and unintentional overwriting of data when there are a plurality of programs which define a shared variable.

Implementation Example by Software

The control block (particularly the program management part 11) of the control device 1 may be implemented by a logic circuit (hardware) formed in an integrated circuit (IC chip) or the like, or may be implemented by software.

In the latter case, the control device 1 includes a computer executing instructions of a program, which is software that implements each function. The computer includes, for example, one or more processors and a computer-readable recording medium which stores the program. Then, in the computer, the processor reads the program from the recording medium and executes it to thereby achieve the objective of the disclosure. The processor may be, for example, a CPU (central processing unit). As the recording medium, a "non-transitory tangible medium" such as a ROM (read only memory), a tape, a disk, a card, a semiconductor memory, a programmable logic circuit, and the like may be used. Moreover, a RAM (random access memory) for developing the above program may be further provided. Further, the program may be supplied to the computer via any transmission medium (communication network, broadcast wave, etc.) capable of transmitting the program. It is noted that one aspect of the disclosure may also be implemented in the form of a data signal embedded in a carrier wave, in which the above program is embodied by electronic transmission.

Summary

A control device according to one aspect of the disclosure includes a program management part, a data storage part, and a shared variable symbol table. The program management part executes a first user program and a second user program. The data storage part stores data of a shared variable referenceable from both the first user program and the second user program. The shared variable symbol table stores an address of the shared variable in the data storage part. The program management part acquires an identifier of the first user program, generates a shared variable name including the identifier and a variable name of the shared variable defined in the first user program, and associates the shared variable name and the address of the shared variable with each other and records them in the shared variable symbol table.

According to the above aspect, it is possible to prevent a conflict between variable names and unintentional overwriting of data when there are a plurality of programs which define a shared variable.

Upon receiving an instruction from the second user program to read or write the shared variable using the shared variable name as a key, the program management part of the control device acquires the address corresponding to the shared variable name from the shared variable symbol table, and reads or writes the shared variable of the data storage part using the address.

According to the above aspect, the program management part can read or write the shared variable of the data storage part already generated by the program A.

In the control device, the first user program is compiled in machine language. The first user program includes information of the variable name of the shared variable and information of the address. The program management part acquires the variable name of the shared variable and the address from the first user program.

According to the above aspect, the program management part can acquire the variable name of the shared variable and the address from the first user program.

In the control device, the first user program is an interpreter type program. The first user program includes information of the variable name of the shared variable. The program management part functions as an interpreter for the first user program. Upon acquiring the variable name of the shared variable from the first user program, the program management part generates the shared variable name, acquires the address of the shared variable in a case where the shared variable name is recorded in the shared variable symbol table, and determines the address to be assigned to the shared variable in a case where the shared variable name is not recorded in the shared variable symbol table.

According to the above aspect, the program management part can prevent duplication of shared variables and appropriately manage the shared variables.

In the control device, the first user program includes information of the identifier, and the program management part acquires the identifier from the first user program.

In the control device, the program management part acquires the identifier from a configuration file.

In the control device, upon executing the second user program, the program management part creates a non-shared symbol table recording a non-shared variable and an address of the non-shared variable. In a case where a variable name of a variable referenced in the second user program is recorded in the non-shared symbol table, the program management part determines that the variable is a non-shared variable. In a case where the variable name of the variable referenced in the second user program is not recorded in the non-shared symbol table, the program management part determines that the variable is a shared variable.

According to the above aspect, according to whether the variable name of the variable referenced in the second user program is recorded in the non-shared symbol table, the program management part can suitably determine whether the variable is a non-shared variable or a shared variable.

In the control device, the first user program and the second user program are configured in programming languages different from each other.

According to the above aspect, variables can be shared between the first user program and the second user program configured in programming languages different from each other.

In the control device, the identifier includes a path of the first user program.

In the control device, the identifier includes a file name of the first user program.

A control method according to one aspect of the disclosure, which is a method of executing a first user program and a second user program, includes the following steps. An identifier of the first user program is acquired. A shared variable name including the identifier and a variable name of a shared variable which is referenceable from the second user program and defined in the first user program is generated. The shared variable name and an address of the shared variable are associated with each other and recorded in a shared variable symbol table. Data of the shared variable are stored in an area corresponding to the address in the data storage part.

According to the above aspect, it is possible to prevent a conflict between variable names and unintentional overwriting of data when there are a plurality of programs which define a shared variable.

The disclosure is not limited to the above-described embodiments, and various modifications may be made within the scope of the claims. The technical scope of the disclosure also includes embodiments obtained by appropriately combining the technical means disclosed in the different embodiments.

What is claimed is:

1. A control device comprising:
    a processor executing a first user program and a second user program that share variables;
    a memory storing data of a shared variable referenceable from both the first user program and the second user program; and
    a shared variable symbol table storing an address of the shared variable in the memory, wherein
    the processor
        acquires an identifier of the first user program,
        generates a shared variable name comprising the identifier and a variable name of the shared variable defined in the first user program, and
        associates the shared variable name and the address of the shared variable with each other and records them in the shared variable symbol table.

2. The control device according to claim 1, wherein
    upon receiving an instruction from the second user program to read or write the shared variable using the shared variable name as a key, the processor acquires the address corresponding to the shared variable name from the shared variable symbol table, and
    the processor reads or writes the shared variable of the memory using the address.

3. The control device according to claim 1, wherein
    the first user program is compiled in machine language,
    the first user program comprises information of the variable name of the shared variable and information of the address, and
    the processor acquires the variable name of the shared variable and the address from the first user program.

4. The control device according to claim 1, wherein
    the first user program is an interpreter program,
    the first user program comprises information of the variable name of the shared variable,
    the processor functions as an interpreter for the first user program, and
    upon acquiring the variable name of the shared variable from the first user program, the processor
        generates the shared variable name,
        acquires the address of the shared variable in a case where the shared variable name is recorded in the shared variable symbol table, and
        determines the address to be assigned to the shared variable in a case where the shared variable name is not recorded in the shared variable symbol table.

5. The control device according to claim 3, wherein the first user program comprises information of the identifier, and
    the processor acquires the identifier from the first user program.

6. The control device according to claim 3, wherein the processor acquires the identifier from a configuration file.

7. The control device according to claim 1, wherein, upon executing the second user program,
    the processor creates a non-shared symbol table recording a non-shared variable and an address of the non-shared variable,
    in a case where a variable name of a referenced variable referenced in the second user program is recorded in the non-shared symbol table, the processor determines that the referenced variable is a non-shared variable, and
    in a case where the variable name of the referenced variable referenced in the second user program is not recorded in the non-shared symbol table, the processor determines that the referenced variable is a shared variable.

8. The control device according to claim 1, wherein the first user program and the second user program are configured in programming languages different from each other.

9. The control device according to claim 1, wherein the identifier comprises a path of the first user program.

10. The control device according to claim 1, wherein the identifier comprises a file name of the first user program.

11. A control method which is a method of executing a first user program and a second user program that share variables, comprising:
   acquiring an identifier of the first user program;
   generating a shared variable name comprising the identifier and a variable name of a shared variable which is referenceable from the second user program and defined in the first user program;
   associating the shared variable name and an address of the shared variable with each other and recording them in a shared variable symbol table; and
   storing data of the shared variable in an area corresponding to the address in a memory.

* * * * *